United States Patent

Melzner

[11] Patent Number: 5,945,041
[45] Date of Patent: Aug. 31, 1999

[54] METHOD AND DEVICE FOR PRODUCING LENSES OF MICROOPTICAL SYSTEMS AND OPTICAL EMITTER/RECEIVER SYSTEM

[75] Inventor: Edgar Melzner, Munich, Germany

[73] Assignee: STM Sensor Technologie Munchen GmbH, Taufkirchen, Germany

[21] Appl. No.: 08/905,362

[22] Filed: Aug. 4, 1997

[30] Foreign Application Priority Data

Aug. 6, 1996 [DE] Germany ............ 196 31 736

[51] Int. Cl.[6] ................ B29D 11/00
[52] U.S. Cl. ............ 264/1.1; 264/1.36; 264/408; 425/174.4
[58] Field of Search ............ 264/1.1, 1.36, 264/1.37, 1.27, 406, 408, 409, 410, 1.7, 2.7; 425/174.4

[56] References Cited

U.S. PATENT DOCUMENTS

| | | | |
|---|---|---|---|
| 2,332,674 | 10/1943 | Smith | 264/408 |
| 3,454,686 | 7/1969 | Jones | 264/1.36 |
| 4,440,699 | 4/1984 | Smid et al. . | |
| 4,501,637 | 2/1985 | Mitchell et al. . | |
| 4,716,851 | 1/1988 | Saito et al. . | |
| 5,534,101 | 7/1996 | Keyworth et al. . | |

FOREIGN PATENT DOCUMENTS

| | | | |
|---|---|---|---|
| 4214654 | 11/1993 | Germany . | |
| 55-56676 | 4/1980 | Japan | 264/1.27 |
| 56-46574 | 4/1981 | Japan . | |
| 56-50587 | 5/1981 | Japan . | |
| 58-186977 | 11/1983 | Japan . | |
| 59-40342 | 3/1984 | Japan | 264/1.37 |
| 60-042880 | 3/1985 | Japan . | |
| 60-126874 | 7/1985 | Japan . | |
| 61-96780 | 5/1986 | Japan . | |
| 61-144890 | 7/1986 | Japan . | |
| 61-163673 | 7/1986 | Japan . | |
| 61-253872 | 11/1986 | Japan . | |
| 62-174980 | 7/1987 | Japan . | |

OTHER PUBLICATIONS

"Lichtemitterdioden VQZ 101, VQA 201, VQA 301, VQA 102, and VQA 202", by K. Goernemann, Radio Fernsehen Electronik, 38 (1989) No. 5, pp. 301 and 302.

Primary Examiner—Mathieu D. Vargot
Attorney, Agent, or Firm—Price Gess & Ubell

[57] ABSTRACT

Method and device for producing lenses of microoptical systems and an optical emitter/receiver system. A curable liquid lens material is introduced into a mount which serves as a lens holder for the lens to be produced, and a convex lens surface is formed at an opening of the mount. The lens material introduced into the mount is irradiated with light during its introduction. An optoelement which forms part of the microoptical system is arranged relative to the lens at a position which it shall assume in the completed microoptical system. Simultaneously with the introduction process, either the image of a light emitter as the optoelement is measured in a selected plane at the side of the mount opposite the optoelement, or the signal intensity of the signal which is changed in an optical sensor as the optoelement as a result of incident light, and the introduction process is terminated when the image or the signal has reached a predetermined size and/or shape.

15 Claims, 5 Drawing Sheets

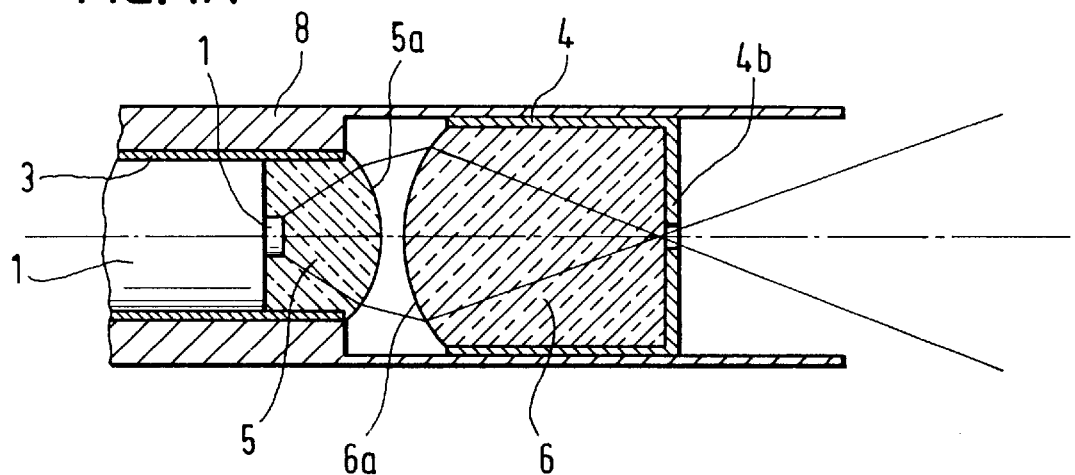
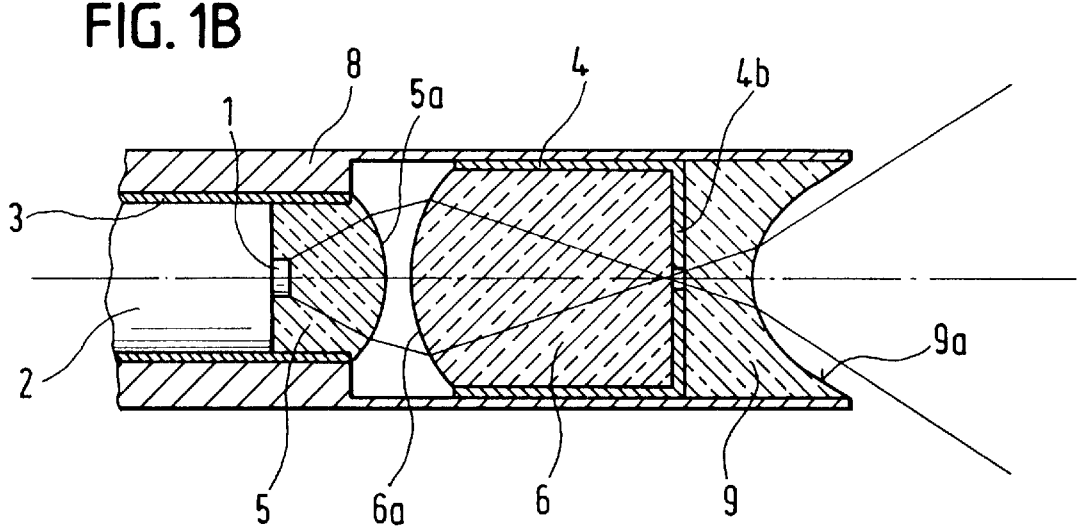
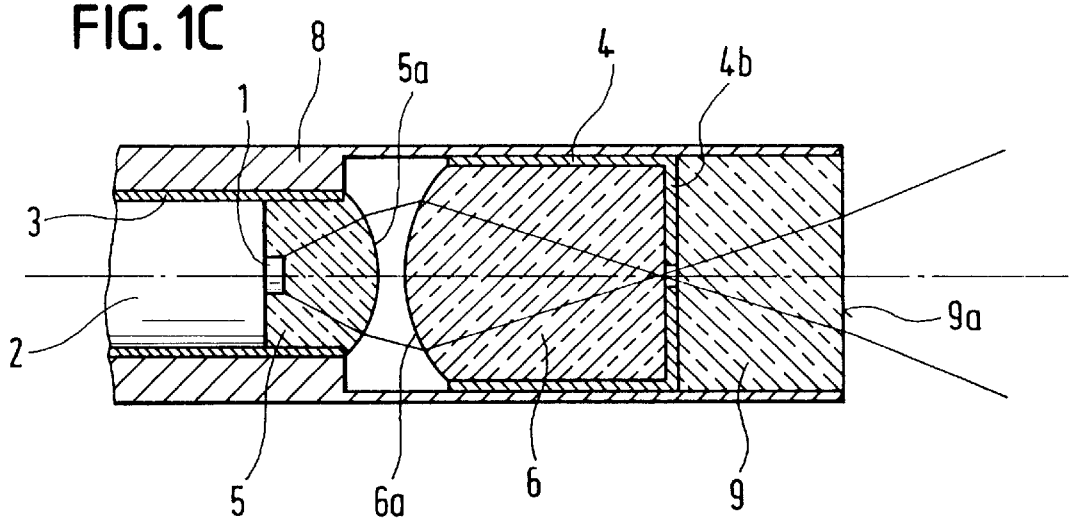

METHOD AND DEVICE FOR PRODUCING LENSES OF MICROOPTICAL SYSTEMS AND OPTICAL EMITTER/RECEIVER SYSTEM

BACKGROUND OF THE INVENTION

1. Field of the Invention

The invention regards a method and a device for producing lenses of optical systems, in particular of microoptical sensor systems and microoptical transmission systems, as well as a microoptical emitter/receiver system which can be produced by the method and the device.

2. Description Related Art

It is known to produce lenses of microoptical systems by pouring a transparent, curable liquid lens material into the desired lens mould. The lenses cast in this manner are then attached to a suitable lens holder together with optoelements, such as light emitters or optical sensors, which are also provided in the microoptical system, and, in doing so, are brought into the desired position relative to each other. In most cases the parts are attached by using adhesives.

When producing miniature lenses, such as the ones used e.g. for focussing beams in miniature light barrier systems, this manner of production causes great difficulties if simultaneously a high quality imaging is required. The microoptical systems have to be produced with great mounting accuracy in order that the desired optical effect, e.g. a beam focussing, may indeed be achieved. Particularly the axial position of the lens relative to the light source or the optical sensor must be met very accurately or must be adapted to the exact curvature of the lens produced. However, a lateral inaccuracy in the position of the lens with respect to the optical axis or a tilting with respect to the optical axis can result in a poor operatability of the manufactured microoptical system.

The attempt is made to solve this problem by undertaking great efforts with respect to measuring in order to maintain a predetermined axial position when glueing the prefabricated lens into the microoptical system. On the other hand, the produced microoptical systems are subjected to intensive quality controls. If a specific result is asked for, only those pieces may be used whose optical properties lie within a narrow margin. This results either in high reject rates, which cause very high costs, or in that the pieces of minor quality are used nevertheless and a poorer optical workmanship has to be accepted.

Especially high-quality miniature light barrier systems in which a plurality of highly accurate lenses are required, cannot be manufactured at justifiable production costs, when customary methods are used and systems of the customary design are produced.

SUMMARY OF THE INVENTION

The present invention solves the problem of creating a method and a device for producing lenses of optical systems, in particular of microoptical lens systems, in such a way that the lenses may be produced such that the desired optical properties of the microoptical system for which the lens is provided are met with a high degree of accuracy, and of creating a highly accurate optical emitter/receiver system which can be produced by the method and the device.

According to the invention, the problem is solved by the following two variants of a method for producing lenses of microoptical systems:

With the method for producing lenses of microoptical systems, in particular of optical sensor systems, according to the first variant:

a curable liquid lens material is introduced into a mount which serves as a lens holder for the lens to be produced, and a convex lens surface is formed at an opening of the mount;

the lens material introduced into the mount is irradiated with light during its introduction, the light being generated by a light emitter which forms part of the microoptical system and is arranged relative to the lens in a position which it shall assume in the completed microoptical system;

simultaneously with the introduction process, the image of the light beam emitted by the light emitter is measured in a selected plane at the side of the mount opposite the light emitter;

the introduction process is terminated when the image has reached a predetermined size and/or shape; and the curable liquid lens material is cured.

With the method for producing lenses of microoptical systems, in particular of optical sensor systems, according to the second variant:

a curable liquid lens material is introduced into a mount which serves as a lens holder for the lens to be produced, and a convex lens surface is formed at an opening of the mount;

the lens material introduced into the mount is irradiated with light during its introduction, the light being detected by an optical sensor which forms part of the microoptical system and is arranged relative to the lens in a position which it shall assume in the completed microoptical system;

simultaneously with the introduction process a signal generated as a result of the light shining in the optical sensor is measured, the introduction process is terminated when the signal has reached a predetermined size and/or shape;

the curable liquid lens material is cured.

By means of the suggestion according to the invention, i.e. to produce the lens in situ in the already assembled microoptical system and to use the current optical outcome produced by the device at the current production stage during the production process in order to determine the further course of the production process, it is achieved that the position of the produced lens in the optical system and its shape are adapted to each other in such a manner that a desired optical result is achieved.

When the curable liquid transparent lens material, i.e. particularly a transparent synthetic material, is filled into a mount whose dimensions are of a magnitude where the effects of surface tension play an important role as compared to other forces such as, e.g. gravitation, especially into a mount for a miniature lens, a meniscus is formed at the free opening which meniscus represents the current lens surface. If the forces mainly dominating the process are cohesive forces and the liquid is homogenous, an essentially spherical surface is formed.

When material is added, the curvature of the lens surface changes and the vertex of the meniscus is displaced. The circumferential line of the lens surface remains at essentially the same position of the mount, e.g. it is frozen in position at an edge provided therefor. In the case of a tubular mount, for instance, the vertex can gradually be displaced from within the mount towards the tube opening and finally towards a region outside the mount. Since the edge of the curved lens surface remains at essentially the same position of the mount, e.g. at the tube opening, the curvature simultaneously changes from concave to convex. Hence, when lens material is filled in, simultaneously the vertex of the lens surface is displaced relative to the mount and the curvature of the lens surface changes, e.g. from concave to convex. According to the invention the mount need not necessarily be a tube. It can, for instance, also consist of a part of a suitable component, in which part the edge of an opening is formed. For example, a mount can also be formed by a ring made of wire or any other suitable material. If the mount is designed as a narrow ring, two convex lens surfaces are formed when it is filled, whose curvature becomes increasingly convex when material is added. According to the invention the mount can have any suitable design. The mount may also have boundary lines which deviate from the circular shape. An oval contour of the mount results e.g. in a lens surface being formed which has the shape of an ellipsoidal portion.

Hence, the formed optical system undergoes a series of varying shapes, each of which combining a particular position of the formed lens relative to the rest of the system elements and a particular shape of the formed lens.

Even the desired result to be achieved by the microoptical system can usually be produced by a group of different shapes each combining a particular position of the formed lens relative to the rest of the system elements and a particular shape of the formed lens. In most cases there exists exactly one combination of lens position and lens curvature which is assumed at the mount during the filling process and also belongs to the group of desired solutions. Hence, the microoptical system having the desired properties is achieved simply by carrying out the process of filling in liquid transparent lens material until exactly this combination has been realized. By terminating the filling process and curing the lens material the lens shape obtained may then be preserved.

On account of the fact that the production process is performed directly, using an optical processing result of the microoptical system as a control value, systematic errors caused by measuring are ruled out and a high accuracy of the microoptical system is made possible.

Due to the fact that during production of the lens the remaining components forming part of the microoptical system, namely the mount and the optoelement, i.e. the sensor or the light emitter, or possibly other lens surfaces, are already arranged in the position with respect to each other which they shall also assume in the completed microoptical system, and due to the fact that by forming the lens at a defined position in the mount, e.g. a sharp edge, the same is also produced in exactly that position which it assumes in the completed microoptical system relative to the other components, errors caused during production or assembly are excluded when setting the relative position, and thus the high accuracy of the microoptical system is guaranteed.

Depending on the respective embodiment, the possibility may exist to again detach individual components from each other even after the lens has been produced. In that case, means have to be provided which ensure that during the subsequent assembly the same relative position is achieved again.

As a control value either the image of a light beam is used which passes through the microoptical system starting out from exactly that light emitter which also emits light beams in the completed system, or the signal resulting from a light beam passing through the microoptical system is used as a control value, which signal is converted in exactly that optical sensor (e.g. photodiode) which as a sensor processes light beams in the completed microoptical system. With both alternatives the further production process is controlled in dependence on the current processing result of the microoptical system at the current production state of the lens. Thereby it is achieved that the optical result used during the production process, i.e. a light beam having a certain shape and intensity, is based on an optical processing which corresponds to the processing taking place when the microoptical system is used as specified.

If the optoelement is an optical sensor, it may be e.g. a photosensitive element such as a photodiode or a phototransistor, or any other suitable optical sensor. If a light emitter is provided as the optoelement, it is possible that a light source is used therefor, i.e. an element which generates light itself. Similarly, however, it is possible that a different light emitter is provided which only transmits light, such as e.g. an optical fibre or the output of another suitable microoptical system at whose input a light generator is arranged. Any other component which as an object is irradiated by another light source and reflects light can also constitute the light emitter.

Preferably, the optoelement is a light source which generates light itself, or an optical sensor. In that case, the method according to the invention is particularly well suited to produce light barrier and light scanner transmission elements if the optoelement is a light source, or to produce light barrier and light scanner receiving elements if the optoelement is an optosensor.

According to the invention, the lens may be formed by merely filling the liquid lens material into the mount. Due to the cohesive forces an essentially spherical lens surface is formed. Preferably, however, a certain aspherical shape of the lens surface is produced by the concerted use of further forces, e.g. an ellipsoidal surface which is suitable for rendering the light beams originating at a point light source parallel, or a surface having essentially an ellipsoidal shape. Such an aspherical lens surface can be produced e.g. by employing gravitational forces. To this end, the optical axis of the lens surface has to be aligned in the direction of gravity. As an alternative or in addition, acceleration forces may be employed. Further possible measures for purposefully influencing the lens shape are to increase the temperature or to add fillers to the lens material. When producing such special lens shapes the control of the further production process in dependence on the current optical processing result is especially advantageous, because in the case of such lenses high demands are made on the finishing accuracy which can be met particularly well by means of this method.

According to the invention it is possible to perform the process of producing the lens only once, until the lens has been completed. However, the process of filling in and curing the lens casting material can also be performed several times, whereby the desired lens is produced in several steps. Preferably, however, the process of producing the lens is carried out consecutively several times with different lens casting materials having different refractive indices. In this manner achromatic lenses may be produced at low costs.

According to the invention, lens elements which are produced by other production methods and to which then a further lens piece is attached by means of the method according to the invention, may also be used.

According to the invention, the process of filling the transparent curable lens material into the mount can be terminated at exactly the time when the exact image has been achieved as an optical result of the processing of the microoptical system which corresponds to the desired processing of the microoptical system to be produced. Preferably, however, the filling is continued to a certain extent, so that right from the start a shrinkage of the lens body during the curing of the liquid lens material is taken into account. If the material shrinks, a defined addition of material is necessary to ensure that the completely cured lens has exactly the shape and assumes exactly the position by which the desired optical result is produced. The extent of the addition can depend on values derived from experience or on empirically obtained data. For instance, it can be waited until there is a certain percental change in the size of the image compared to the desired image result or in the signal magnitude compared to the desired signal magnitude, or a certain percentage of material may be added. It is also possible to arithmetically determine the change in the image to be expected and the necessary quantity of material to be added.

A change in the refractive index of the lens material, which often occurs during the transition from the liquid state to the cured state, may also be compensated for in this or a similar manner. Depending on the direction in which the refraction changes, either more or less material is filled into the mount than corresponds to the desired result when the lens material is still liquid.

According to the invention it is also possible to correct the shape of the lens when the production process has been completed. This can be done in different ways. One possibility is to remove the meniscus of the lens and to produce a new lens. Another possibility is to mechanically work the produced lens. In case too little material was filled in, there is also the possibility of applying a layer of additional lens material after the lens has been cured, so as to achieve the desired state in this way.

According to the invention, the mount and the optoelement, as well as possible further optical components, can be brought into the desired position relative to each other in a random suitable manner. Preferably, however, prior to the introduction process the mount is put onto a cylindrical holder to which the optoelement has been attached. Subsequently, a stop shoulder formed on the mount is pushed against a stop formed on the cylindrical holder. In this manner the position of the mount relative to the optoelement is established by providing a positive connection. With such an embodiment of the invention the mount may also be detached from the optoelement again, if necessary, after the production process, e.g. so as to insert further optical components into the beam path, and can subsequently again be brought into the same position relative to the optoelement without great difficulty.

According to the invention the method can be carried out with a single mount and the optoelement. Preferably, however, prior to the introduction process an additional mount, e.g. in the shape of a tube, is brought into a predetermined position relative to the mount supporting an already prefabricated lens surface. This lens surface can be formed e.g. at the end of the additional mount facing the optoelement in the assembly state, so that at the side of the additional mount opposite the optoelement liquid lens material can be filled in to produce a new lens, without the existing lens surface being changed. In this manner it is possible to produce a multistage lens system having several differently shaped lens surfaces, e.g. a concave lens surface at the side facing the optoelement and a convex lens surface at the side opposite the optoelement. In this context, curved lens surfaces may also have an infinite radius of curvature, i.e. the special case of a plane lens surface may be realized. Such planar lens surfaces can be provided, for example, as part of a plano-convex or a plano-concave lens.

According to the invention it is possible that during production of the lens no additional components are used at all, or only components which hold lens surfaces. Preferably, however, prior to the introduction process of the liquid lens material an aperture diaphragm is arranged in a predetermined position relative to the mount. The aperture diaphragm may be designed as an independent component, but it may also be connected to the mount or to a further mount having a prefabricated lens surface. In this way microoptical systems may be produced by the method according to the invention which, apart from lens surfaces, also comprise aperture diaphragms.

In a first variant, the device for producing lenses of microoptical systems according to the invention is provided with:

a support which can accomodate a mount and an optoelement along their common optical axis in a defined position relative to each other;

a photometer device consisting of microoptical sensors arranged on a measuring surface, by which the shape and/or size of the image of a light beam originating at the optoelement and shining in the measuring surface can be measured, and whose measuring surface is perpendicular to the optical axis, wherein the photometer device and the support can be positioned so as to be adjustable relative to each other in the direction of the optical axis;

a dosing unit by means of which a liquid curable transparent lens material can be introduced into the mount in dosed quantities; and a control unit by means of which control signals for controlling a dosing process can be detected on the basis of the shape and/or size of the image of the optoelement measured by the photometer device and of a predetermined image, and can be transmitted to the dosing unit.

In a second variant, the device for producing lenses of microoptical systems according to the invention is provided with:

a support which can accomodate a mount and an optical sensor along their common optical axis in a defined position relative to each other;

a signal measuring device which is connected to an output of the optical sensor and by means of which the shape and/or size of the signal generated by the optical sensor as a result of light shining into the optical sensor can be measured;

a dosing unit by means of which a liquid curable transparent lens material may be introduced into the mount in dosed quantities; and a control unit by means of which control signals for controlling a dosing process can be detected on the basis of the shape and/or size of the signal measured by the signal measuring device, and can be transmitted to the dosing unit.

The highly accurate production of lenses of microoptical systems is achieved in that a device is created which is suitable for carrying out the method according to the invention. The initial position of the components of the microoptical system is ensured with the aid of a support. The liquid lens material is filled into the mount by using the dosing unit.

In the case of an embodiment of the invention which is suitable for producing microoptical systems with a light emitter as the optoelement, the optical result achieved by the microoptical system during and at the end of the production process is detected by a photometer device, and a control unit is designed such that it permits the interaction of the other components of the device as defined by the method according to the invention.

The ability of positioning the photometer device, e.g. a CCD camera, and the support with the mount and the optoelement in a defined position relative to each other, can be ensured without a specific component for the distance measurement. Preferably, however, the device for producing lenses of microoptical systems comprises a distance meter by which the distance between the mount and the measuring plane of the photometer device can be measured.

With another embodiment of the device for producing lenses of microoptical systems according to the invention, namely an embodiment which is suitable for producing systems with an optical sensor, a signal measuring device is provided in addition to the support and the dosing unit, which device measures the signal generated by the microoptical sensor as a result of light impinging thereon. The control unit is then designed such that it controls the interaction of the other components of the device on the basis of the measured signal as specified in the method according to the invention.

According to the invention it is possible that the device for producing lenses of microoptical systems of the type having an optical sensor has no additional light source to emit light which can be sensed during the production process. In this case, it is the common ambient light which is sensed by the sensor during the production process. Preferably, however, the device for producing lenses of microoptical systems having an optical sensor has an additional light source, e.g. a laser beam device, such as to emit the light to be sensed by the optical sensor during the production process.

The optical emitter/receiver system according to the invention is provided with an optical emitter element and/or an optical receiving element, wherein the optical emitter element and/or the optical receiving element comprise(s):
  an uncut lens surface which is formed by a lens casting material and at whose boundary line two randomly selected boundary line points have a distance of 5 mm at a maximum,
  a mount which supports the lens casting material and at which a circumferential edge is formed along which the boundary line of the lens surface extends, and
  an optoelement which, in the case of the optical emitter element, is a light emitter and, in the case of the optical receiving element, is a light sensor.

The highly accurate optical emitter/receiver system according to the invention comprising an optical emitter element and/or an optical receiving element is realized in that a design is chosen which is especially well suited for producing at least one lens surface according to the method according to the invention. This is achieved in that a lens made of lens casting material is provided, in particular made of a synthetic material such as epoxy resin. Due to the fact that the lens is of a size where capillary forces are dominant compared to gravitational forces and other forces, e.g. has a circular boundary line with a diameter of less than 5 mm, preferably less than 3 mm or less than 1 mm, or an oval boundary line with a main axis having the mentioned maximum dimensions, the production method according to the invention is better suited for producing the optical emitter/receiver system according to the invention than customary methods. Thus, the optical emitter/receiver system can be produced with little effort.

Due to the fact that an uncut lens surface is provided in the optical emitter/receiver system according to the invention, there are no additional expensive production steps. By providing an edge at the mount it is ensured that the boundary line of the lens surface is formed at a defined position and remains there. Consequently, when the lens casting material is filled in, the vertex position and the lens curvature are only two of the parameters that change, and this change occurs quite continuously, whereby a highly accurate production of the optical emitter/receiver system according to the invention is guaranteed.

According to the invention, the optical emitter/receiver system can, for example, be a miniature light barrier system or a miniature optical information emitter system, or a partial system of such systems.

According to the invention it is possible that the relative position of a mount and the optoelement assigned thereto or the holder of the optoelement, respectively, is not determined by construction or as a positive connection or fixed by friction effects. Preferably, however, this relative position is fixed by the form or shape of the elements, preferably by means of an axial stop. Thereby the manufacturing accuracy is further improved. If necessary, it is even made possible to detach the lens and the optoelement, so that additional parts may later be inserted. This possibility makes the optical emitter/receiver system according to the invention even more adequate for the production method according to the invention.

According to the invention an optoelement in the optical emitter/receiver system, in particular in a light barrier system, can be arranged freely exposed or in a hollow space, it may also be in contact with the lens material. Preferably, the optoelement is sealed with the lens casting material, i.e. all surface areas which are not in contact with other parts, such as e.g. the support of the optoelement, are embedded in lens casting material.

According to the invention, the connection between the mount and the lens casting material can be established or supported by means of adhesive which can either be added to the lens casting material or which is provided as a separate layer. Preferably, however, no adhesive is used when connecting the mount and the lens, but solely the adhesive forces between the lens material and the mount effect the attachment of lens and mount.

According to the invention it is possible that the optics in the optical emitter/receiver system consist only of the optoelement and the lens. However, in order to achieve a certain beam path, preferably a diaphragm, more preferably an apertured diaphragm, is further provided.

According to the invention it is possible that the optical emitter/receiver system comprises only spherical lens surfaces. Perferably, however, one lens has an aspherical shape, e.g. the shape of a ellipsoidal portion.

According to the invention it is possible that the optical emitter/receiver system comprises a single-stage lens system both in the optical emitter element and/or the optical receiving element. Similarly, it is possible that the optical emitter/receiver system has no lens system at all either in an optical emitter element or an optical receiving element, but only an optoelement, e.g. a light emitter or a light sensor. Preferably, however, the optical emitter/receiver system comprises a multistage lens system in the optical emitter element and/or in the optical receiving element. Such lens systems are better suited, for example, to generate highly accurate, parallel beam paths which are required for bridging greater distances with a simultaneous high lens resolution.

According to the invention it is possible for the optical emitter/receiver system to comprise appropriate partition surfaces in the optical emitter element and/or the optical receiving element, which surface can be provided e.g. because a lens is produced in a plurality of production steps. Preferably, however, the lens casting material has no partition surfaces which result from the production in a plurality of work steps.

According to another preferred embodiment the optical emitter/receiver system comprises different materials having different refractive indices as the lens casting material. Advantageously, a multistage achromatic lens can be formed by adjacent partial lens bodies made of such materials with different refractive properties; thereby special effects may be achieved. The production method according to the invention is particularly well suited for such lens structures in the optical emitter/receiver system, because when a further lens casting material is filled directly onto the surface of an already completed partial lens, it is ensured right from the start that the additional partial lens and the completed partial lens fit exactly. According to the invention it is possible for the optical emitter element in the optical emitter/receiver system to be designed such that beam diameters of up to 5 mm or more having aperture angles of up to 5 degrees or more are generated. It is preferred, however, that the optical emitter element in the optical emitter/receiver system is designed such that light beams having a beam diameter of less than 1 mm, preferably of less than 0.5 mm, and an aperture angle of less than 1 degree, preferably less than 30 angular minutes, can be generated.

BRIEF DESCRIPTION OF THE DRAWINGS

Preferred embodiments of the invention will be described in more detail in connection with the figures. In the drawing:

FIGS. 1A to 1E shows the beam path through a microoptical system at different stages of the process of producing a lens of the system by means of an embodiment of the method according to the invention;

DESCRIPTION OF PREFERRED EMBODIMENTS

Figure 1D:
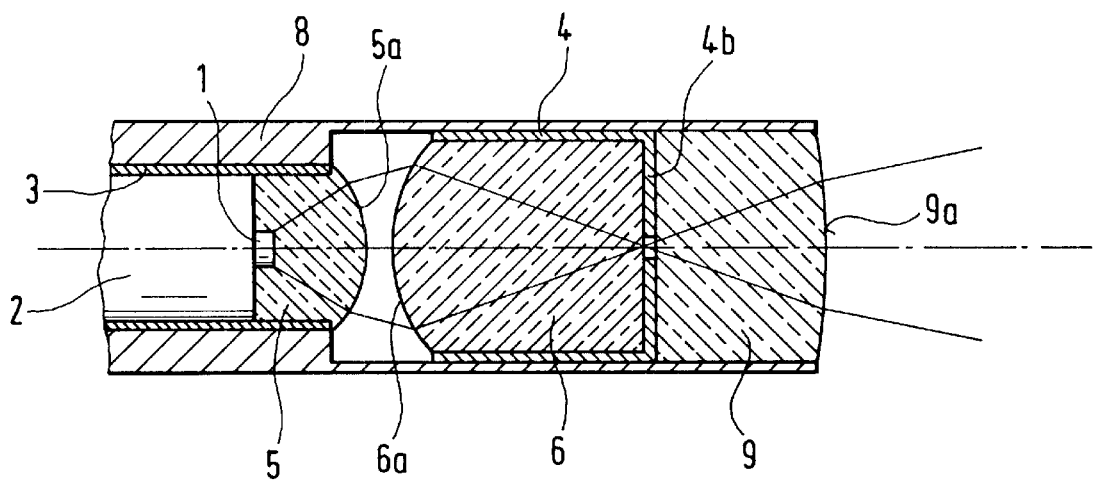

FIGS. 1A to 1E illustrate the production method according to the invention by showing a lens of a three-stage microoptical system being formed, as well as the respective current beam path which originates at an optoelement 1 formed by an emitter and passes through the microoptical system at different stages of production.

FIG. 1A shows the microoptical system at a stage where the production process for the lens to be produced has not yet started. An optoelement 1, here a light emitter, is fixed to a cylindrical holder 2. A mount 3 in the shape of a cylindrical sleeve is pushed onto the cylindrical holder 2 in such a manner that the mount 3 projects over the cylindrical holder 2 in the direction towards the axial end face of the cylindrical holder 2 to which the optoelement 1 is attached. Inside the projecting part the mount 3 is filled with lens casting material 5 such that a convex first lens surface 5a is formed whose boundary line extends along the rim of the cylindrical sleeve of the mount 3. The optoelement 1 is sealed in the lens casting material 5.

A further tubular mount 8 has been pushed onto the mount 3 and projects over the mount 3 at the side of the cylindrical holder 2 where the optoelement 1 is attached. A tubular third mount 4 has been inserted into the further mount 8. The tube end of the third mount 4 opposite the optoelement 1 is provided with an aperture diaphragm 4b whose aperture diaphragm opening is located in the area of the tube axis. At the side of the aperture diaphragm 4b facing the optoelement 1 the third mount 4 is filled with lens casting material 6 in such a manner that a convex second lens surface 6a is formed whose boundary line extends along the rim of the cylindrical sleeve of the mount 8.

The mount 4 with the aperture diaphragm 4b and the lens surface 6a is pushed into the mount 8 to such an extent that a distance exists between the lens surfaces 5a and 6a. The end of the mount 8 opposite the optoelement 1 projects over the mount 4, so that inside the tube end of the mount 8 arranged at the side opposite the optoelement 1 a hollow space exists between the tube opening and the aperture diaphragm 4b of the mount 4, into which hollow space lens casting material 9 can be filled, forming a third lens surface 9a.

The optoelement 1 is designed as a light emitter, and in FIG. 1A the beam path which originates at the optoelement 1 and passes through the optical system including the first lens surface 5a and the second lens surface 6a, is depicted. The light beam passes through the aperture of the aperture diaphragm 4b and has a very large aperture angle behind the same.

From FIGS. 1B to 1E different stages of production of the third lens surface 9a including the resulting beam path can be gathered.

From FIG. 1B a production stage of the lens surface 9a is obvious where only a small amount of lens material 9 has been filled into the mount 8. A meniscus is formed which at first has its vertex within the tube of the mount 8, as well as a concave lens surface 9a. Since it is refracted at the third lens surface 9a which is being produced, the aperture angle of the light beam becomes even larger than at the stage shown in FIG. 1A.

As the filling process continues, the vertex of the lens surface 9a moves closer to the opening and becomes more and more plane. From FIG. 1C the production stage is obvious where the lens surface 9a is planar. In comparison to the production stage obvious from FIG. 1B, the aperture angle of the light beam is reduced again.

From FIG. 1D a stage is obvious where, following the addition of further lens casting material 9, the vertex of the lens surface 9a comes out of the opening of the mount 8 and simultaneously assumes a slightly convex shape. The aperture angle of the emerging beam is greatly reduced.

Figure 1E:
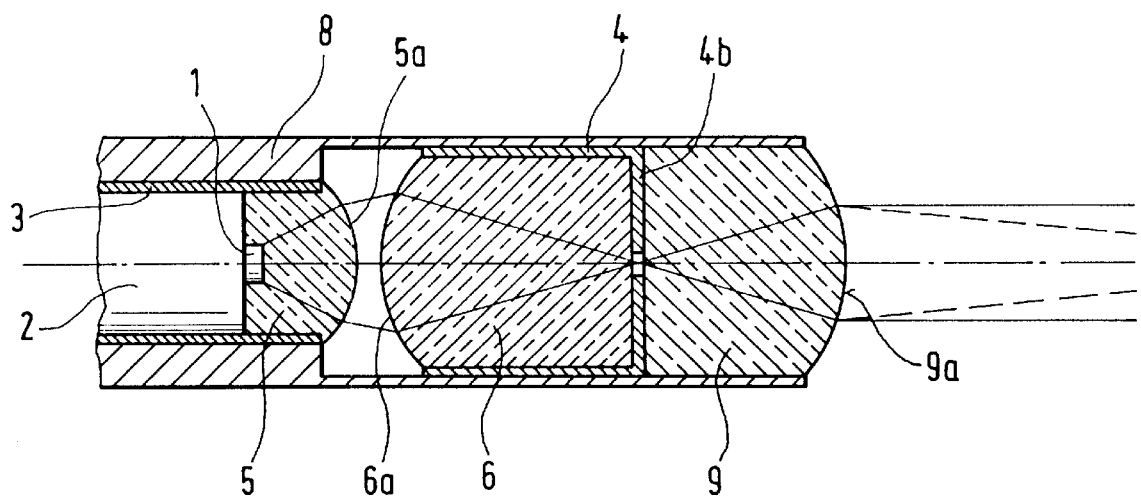

At the end of the filling process with lens casting material 9 the lens surface 9a has a convex shape, as it is obvious from FIG. 1E. A beam path which results after the filling has been completed is illustrated in dashed lines after the beam has emerged from the lens casting material 9. The emerging beam converges and reaches its focal point at a certain distance behind the lens system, which distance may be predetermined.

The continuous lines depict the beam path behind the lens surface 9a which results when a different amount of lens casting material 9 is filled in. This different amount which was filled in causes a slightly different shape of the lens surface 9a (not illustrated in FIG. 1A). As it is obvious from the beam path behind the lens surface 9a illustrated in continuous lines in FIG. 1E, a bundle of rays with essentially parallel rays results. Such a beam can bridge a large distance without losing any of its light intensity or density, and is therefore well suited for light barrier systems with a high resolution.

On account of the regularities of surface tension, the meniscus surface has approximately the shape of a partial sphere during all stages. With regard to the lens surface which is formed spherically, e.g. as a result of absolutely dominant cohesive forces, the regularities of classical optics apply.

Figure 2:
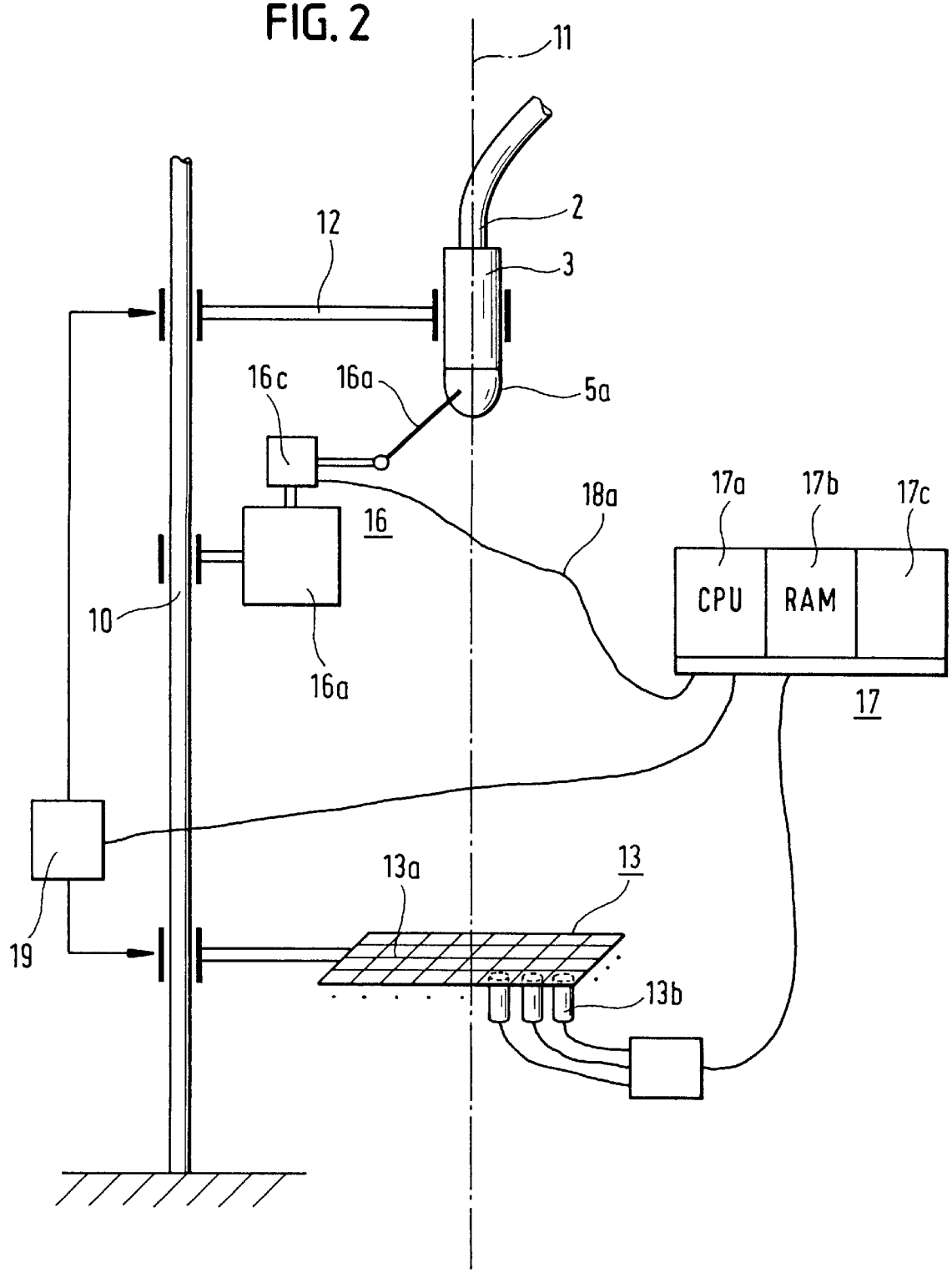
FIG. 2 is a schematic view of an embodiment of the device for producing lenses of microoptical systems according to the invention.

From FIG. 2 a basic structure of a device for producing lenses of microoptical systems according to an embodiment of the invention is obvious.

A support rail 10 extending in parallel to the optical axis 11 of the device carries a support 12 at which the cylindrical holder 2 with the optoelement 1 and the mount 3, as well as possible additional optical elements, are supported in the desired position relative to each other. In this context, the support rail 10 is arranged vertically and the support 12 is designed such that the mount 3 is arranged vertically and the end of the mount 3 where the lens surface 5a is to be formed is directed downwards. In this manner gravitation is utilized when producing the lens surface 5a, in order to obtain an aspherical lens shape.

The photometer device 13 is displaceably supported on the support rail 10. The photometer device comprises a measuring surface 13a with a plurality of optical sensors 13b. By adjusting the position of the photometer device 13 along the rail, a predetermined distance between the mount 3 and the photometer device 13 may be set in axial direction. The measuring surface 13a is arranged in a right angle relative to the optical axis of the device. The optical axis extends substantially through the center of the measuring surface.

In a dosing unit 16 a dosing needle 16a is proviced by means of which liquid lens material can be supplied to the exact position where a lens shall be produced. To this end the position of the dosing needle 16a is variably adjustable. In this embodiment the dosing unit 16 is arranged such that the dosing needle 16a ends at the side of the mount 3 opposite the optoelement. The dosing unit further comprises a material container 16b which can receive liquid lens casting material, and a lens casting material conveying means 16c, e.g. a pump, by which the lens casting material can be conveyed through the dosing needle 16a in dosed amounts.

This embodiment of the device for producing lenses of microoptical systems further comprises a control unit 17 which is connected through signal lines with the microoptical sensors 13b forming the measuring surface 13a of the photometer device 13. The control unit comprises a main processor CPU 17a, a working memory RAM 17b and an additional memory 17c. In the additional memory data connected with certain lens designs which can be produced by the device may be stored. In particular, information may be stored regarding the shape and size of the predetermined image upon whose generation the introduction process for producing a certain lens is to be terminated.

To carry out an embodiment of the method according to the invention this information regarding a lens design can be loaded into a working memory RAM 17b from the additional memory 17c, and can be run together with a processing program for carrying out the method according to the invention.

The control unit 17 is connected to the dosing unit 16 via a signal line 18a. Through this signal line 18a driver signals generated by the control unit 17 during processing can be sent to the dosing unit 16 to convey lens casting material.

The illustrated embodiment of the invention furthermore comprises a distance meter 19 by means of which the distance between the photometer device 13 and the mount 13 can be measured. The distance meter 19 is also connected to the control unit 17 via a signal line 18b. The measured distance values can be received by the control unit 17 and taken into account when determining the signals for driving a dosing process.

Figure 3:
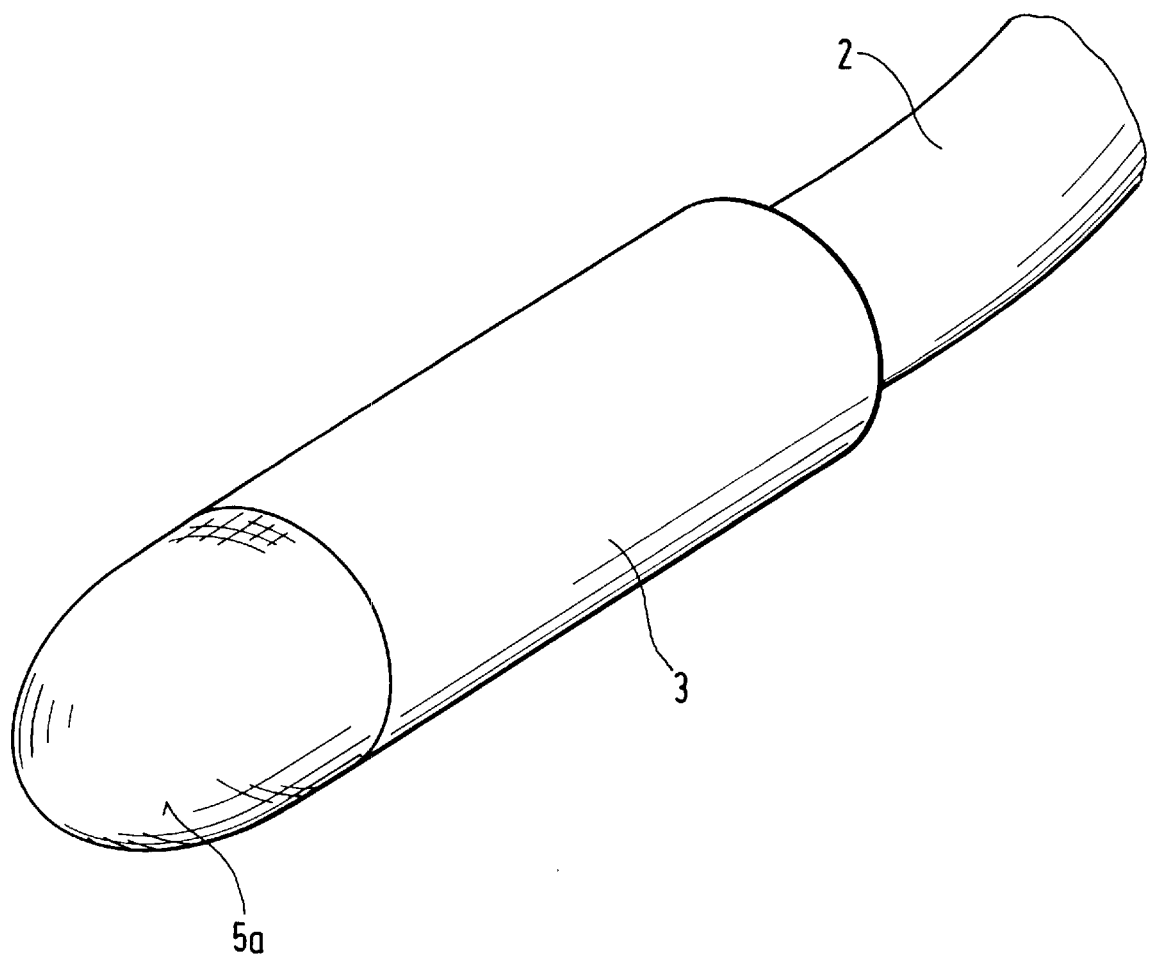
FIG. 3 is a perspective view of an optical emitter element according to an embodiment of the optical emitter/receiver system according to the invention.
Figure 4:
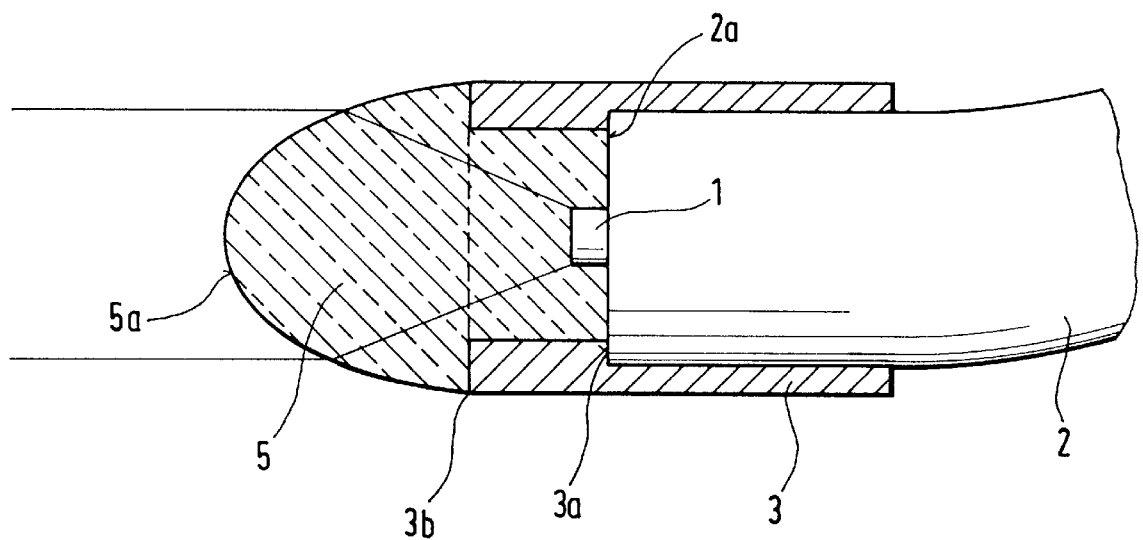
FIG. 4 is an axial-radial section of the optical emitter element according to the embodiment of the optical emitter/receiver system according to the invention and shown in FIG. 3.

FIGS. 3 and 4 depict an embodiment of an optical emitter element of the microoptical optical emitter/receiver system according to the invention. From FIG. 3 a perspective view of the structure of the optical emitter element of the microoptical optical emitter/receiver system according to the invention is obvious. The present embodiment comprises a cylindrical holder 2 which is formed as a flexible electric line and whose end opposite the optoelement 1 does therefore extend into a shape which has a circular cross-section, but is no longer cylindrical. The cylindrical holder 2 extends into the mount 3. At the end of the mount 3 opposite the cylindrical holder 2 a lens surface 5a is formed which has a convex shape. The lens surface is shaped like an ellipsoidal portion.

From FIG. 4 the detailed internal structure of the optical emitter element of the microoptical optical emitter/receiver system according to the invention depicted in FIG. 3 is obvious. The mount 3 is essentially designed as a capillary cylindrical tube. At the end facing the cylindrical holder 2 a step-like tube expansion is provided on the inner surface of the tube. The tube expansion is formed by a step which is formed as an axial stop 3a and is in contact with the axial stop surface 2a at the cylindrical holder 2. In the centre of the end face of the clyindrical holder 2 the optoelement 1 is mounted. At the end of the mount 3 opposite the cylindrical holder 2 an edge 3b is formed at the end of the outer tube surface. The end portion of the mount 3 is filled with lens casting material. A convex lens surface 5a is formed whose boundary line extends along the edge 3b. With the given tubular mount 3 the boundary line of the lens surface 5a extending along the rim of the tube end corresponds to the state of the lens surface 5a where potential energy is at its lowest and which is always assumed automatically. The lens casting material has been filled into the mount 3 such that it completely surrounds the optoelement 1 at the points where it is not in contact with the cylindrical holder 2. Hence, the optoelement 1 is embedded in the lens casting material 5. The lens surface 5a has essentially the shape of an ellipsoidal portion and is designed and arranged such that it refracts the bundle of rays evenly emitted by the optoelement in all directions in such a manner that it becomes an essentially parallel bundle of rays, as is obvious from the beam path illustrated in FIG. 4.

It is possible that the optical emitter element depicted in FIG. 4 according to an embodiment of the microoptical optical emitter/receiver system according to the invention has been produced by a method for producing lenses of microoptical systems according to the invention. The mount 3 is mounted on the cylindrical holder 2 through the interaction of the axial stops 2a and 3a. Subsequently, the optoelement 1 which is supported at the cylindrical holder and, in the present case is a light source, is connected to an electric voltage source and thus emits light. The beam of the image of this light source passes through the single-stage microoptical system being produced and shines in a measuring plane (not shown) at the side of the mount 3 opposite the optoelement 1. Depending on the size and/or shape of this image, the filling process for producing the lens surface 5a in the mount 3 is controlled. In order to render the lens surface 5a in the desired ellipsoidal shape the mount 3 is aligned during the production process in such a manner that the end of the mount 3 opposite the cylindrical holder 2 is directed downwards. As soon as the image has reached the desired shape, the filling process is terminated and the lens casting material 5 is cured.

I claim:

1. Method for producing a lens of a microoptical system, in during which
    a curable liquid lens material (5) is introduced into a mount (3) which serves as a lens holder (2) for the lens to be produced, and a convex lens surface (5a) is formed at an opening of the mount (3);
    the lens material (5) introduced into the mount (3) is irradiated with light during its introduction, the light being generated by a light emitter which forms an optoelement (1) of the microoptical system and which is disposed in a position relative to the lens which it shall assume in the completed microoptical system;
    simultaneously with the introduction process the image of the light beam emitted by the light emitter is measured in a selected plane at the side of the mount (3) opposite the light emitter;
    the introduction process is terminated if the image has reached a predetermined size and/or shape;
    the curable liquid lens material (5) is cured.

2. Method for producing a lens of a microoptical system, in whichs
    a curable liquid lens material (5) is introduced into a mount (3) which serves as lens holder (2) for the lens to be produced, and a convex lens surface is formed at an opening of the mount (3);
    the lens material (5) introduced into the mount is irradiated with light during its introduction, the light being detected by an optical sensor which forms an optoelement (1) of the microoptical system and which is disposed relative to the lens in a position which it shall assume in the completed microoptical system;
    simultaneously with the introduction process a signal generated as a result of the light shining in the optical sensor is measured;
    the introduction process is terminated when the signal has reached a predetermined size and/or shape;
    the curable liquid lens material (5) is cured.

3. Method according to claim 1 or 2, wherein the liquid lens material (5) is rendered in an aspherical shape by the concerted use of gravitation and/or other forces, and the lens is cured in that shape.

4. Method according to claim 1 or 2, wherein first a lens surface (5a) is produced by introducing and curing a lens casting material (5), and subsequently an achromatic lens is formed by introducing and curing additional lens casting material having a refractive index which differs from the refractive index of the first introduced lens casting material (5).

5. Method according to claim 1 or 2, wherein the introduction process is terminated when the measured image of the light beam or the signal generated by the optical sensor reaches a size which deviates to a certain extent from size corresponding to the desired optical processing of the microoptical system to be produced, wherein the deviation is rated such that the change in the optical processing resulting from a shrinking during curing of the lens material and/or as a result of a change in the refractive index of the lens material during curing, is compensated for.

6. Method according to claim 1 or 2, wherein prior to the introduction process the mount (3) is brought into the desired position relative to the optoelement (1) by pushing an axial stop (3a) formed on the mount (3) against a stop surface (2a) formed on a holder (2) on which the optoelement (1) is mounted.

7. Method according to claim 1 or 2, wherein prior to the introduction process an additional mount (8) supporting a previously produced lens surface (6a) is arranged at the mount (3).

8. Method according to claim 1 or 2, wherein prior to the introduction process an additional mount (8) comprising an aperture diaphragm (4b) is arranged at the mount (3).

9. The method of claim 1 further including the step of providing a photometer device at the selected plane and terminating the introduction process when the photometer provides a predetermined output.

10. The method for producing a lens as recited in claim 1, wherein said microoptical system comprises an optical sensor system.

11. A method of producing a lens comprising the steps of:
    providing a structure for supporting a lens;
    transmitting a predetermined pattern of light from a source light;
    providing a detector for measuring the transmission of light;
    introducing a curable liquid lens material into the structure to form an open lens surface with an air interface while simultaneously transmitting the light through the liquid lens material towards the detector;
    continuing to add liquid lens material to alter the lens surface until the transmitted light through the lens material produces a predetermined output from the detector thereby indicating that the desired shape of the lens surface has been achieved; and
    curing the lens material.

12. The method of claim 11 wherein the air interface surface with the liquid lens material is defined by the effects of surface tension of the liquid lens material.

13. A method of producing a lens surface for refracting light without a mold, comprising the steps of:
    providing a support structure where the support structure operates as a lens mount surrounding the lens in a microoptical system;
    transmitting a predetermined pattern of light through the support structure from a source side to an image side;
    positioning a detector on the image side;
    introducing a curable liquid lens material into the support structure to form a lens surface with an air interface in the path of the pattern of light until the detector determines that a predetermined refraction of light will be realized when the liquid lens material is cured; and
    curing the liquid lens material.

14. The method of claim 13 further including suspending the support structure so that gravity will pull the curable liquid lens material lens surface into an aspherial surface configuration.

15. The method for producing a lens as recited in claim 2, wherein said microoptical system comprises a optical sensor system.

* * * * *